United States Patent [19]

Stern

[11] 3,950,253
[45] Apr. 13, 1976

[54] DOMESTIC WATER FILTRATION APPARATUS

[75] Inventor: Emanuel Stern, Mount Kisco, N.Y.

[73] Assignee: Dynek Corporation, Port Chester, N.Y.

[22] Filed: Jan. 8, 1975

[21] Appl. No.: 539,608

Related U.S. Application Data

[63] Continuation-in-part of Ser. No. 308,117, Nov. 20, 1972, abandoned.

[52] U.S. Cl. .............................. 210/282; 210/416
[51] Int. Cl.² ...................................... B01D 27/02
[58] Field of Search ......... 210/25, 85, 95, 172, 244, 210/257, 258, 260, 266, 282, 283, 416, 501

[56] References Cited
UNITED STATES PATENTS

| | | | |
|---|---|---|---|
| 1,727,554 | 9/1929 | Millard | 210/283 |
| 2,785,106 | 3/1957 | Mendelsohn | 210/501 X |
| 2,935,194 | 5/1960 | Tomkin | 210/95 |
| 3,257,315 | 6/1966 | Pall | 210/501 X |
| 3,291,308 | 12/1966 | Headrick et al. | 210/257 X |
| 3,314,544 | 4/1967 | Rosaen | 210/172 |
| 3,342,340 | 9/1967 | Shindell | 210/282 |
| 3,372,808 | 3/1968 | Sabo | 210/501 X |
| 3,498,457 | 3/1970 | Gough | 210/85 |
| 3,539,009 | 11/1970 | Kudlaty | 210/257 X |
| 3,572,508 | 3/1971 | Rice | 210/172 X |

Primary Examiner—Charles N. Hart
Assistant Examiner—Robert H. Spitzer
Attorney, Agent, or Firm—Kenyon & Kenyon

[57] ABSTRACT

A portable domestic water purification and filtration apparatus includes a container for treating water to having a reservoir for storing untreated water and a pump having an inlet connected to pump water from the bottom of the reservoir and an outlet connected within the container to the inlet of a filter device also located within the container. The filter device includes an integral outlet spout for discharging the filtered water over the upper edge of the container.

24 Claims, 3 Drawing Figures

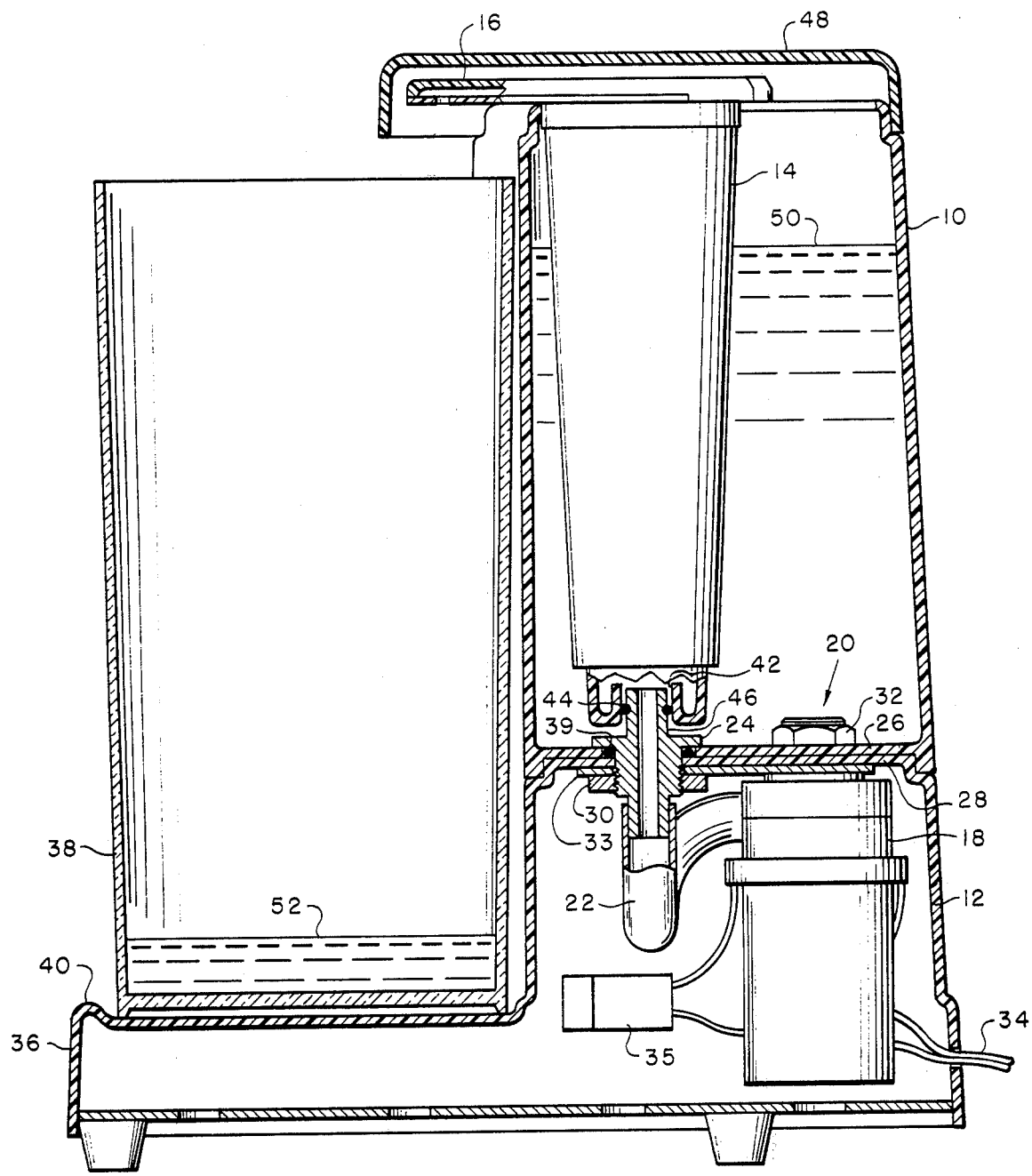
FIG_1

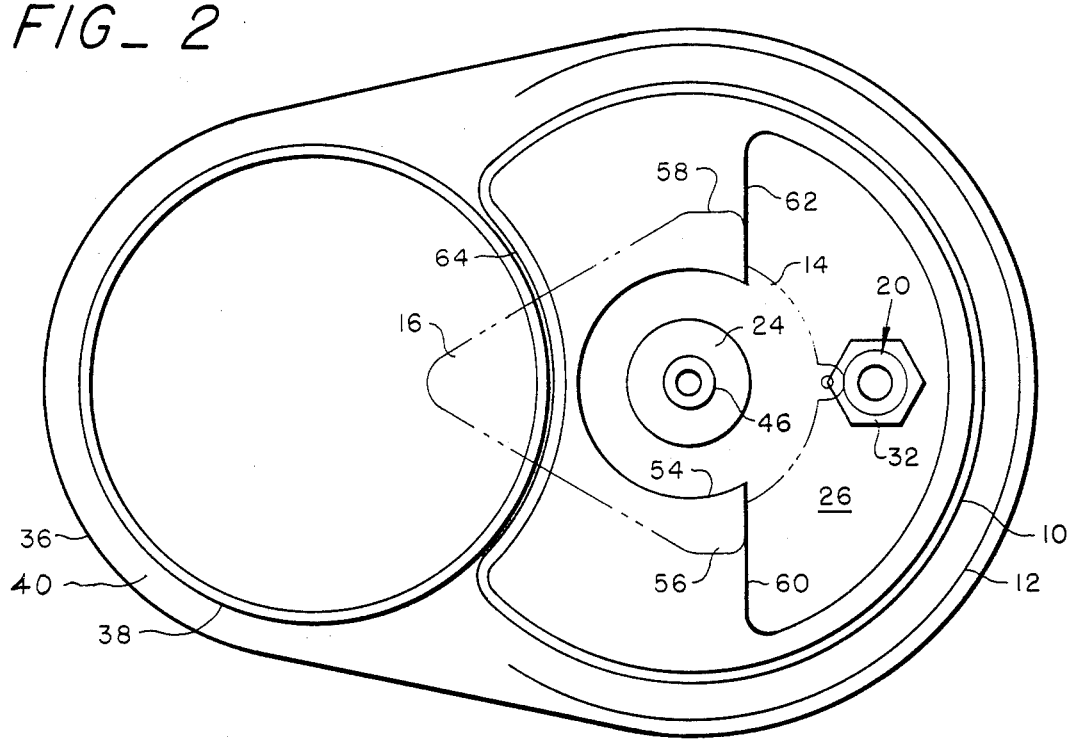
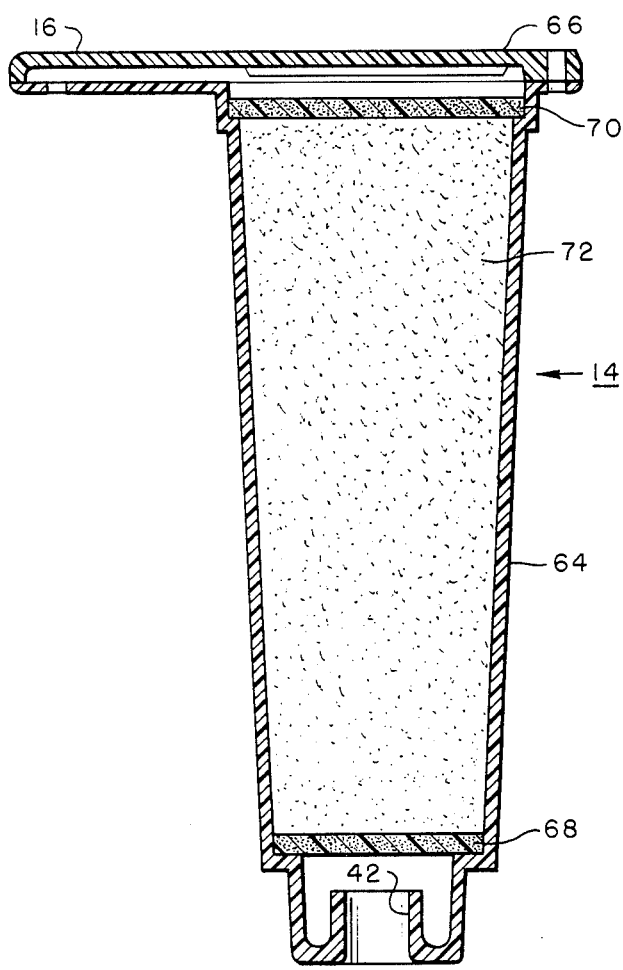

DOMESTIC WATER FILTRATION APPARATUS

This is a continuation-in-part of application Ser. No. 308,117, filed Nov. 20, 1972, now abandoned.

The present invention relates to water filtration apparatus which is particularly suited for domestic use to improve the purity and potability of water.

It is a well known fact that, as population densities increase, it becomes more and more difficult to provide sufficient water of satisfactory purity and potability for domestic use. Because of this, the purity and quality of drinking water, even from municipal water systems, is increasingly poor, and often very unsatisfactory. Furthermore, in addition to industrial and domestic pollution related to high population densities, drinking water in many locations has both a —, after "disagreeable" disagreeable odor and taste because of materials dissolved in the water which while not necessarily harmful, reduce the potability of the water.

Contaminants which affect the taste of water are particularly annoying to people who are not regular residents of the area where the water is supplied. Also, contaminants which affect the taste of water are particularly annoying when the water is used for particular purposes such as the brewing coffee, where the taste of the end product is drastically affected by the contamination.

At the present time, it appears likely that the contamination of ground water may proceed to become so bad in some communities that it will be absolutely essential for each household to take precautionary measures to purify and improve the potability of the water which the members of that household injest, either as drinking water, or from cooking.

Because of these factors, a number of filtration devices have been proposed in the past for the purpose of improving drinking water. However, these prior devices have generally been quite ineffective because of deficiencies and inadequacies of design. Most commonly, such filters have employed only one filtration medium, generally charcoal, and have thus been limited in effectiveness to removal of only those contaminants for which that medium is effective. These contaminants are generally organic materials and odoriferous materials dissolved halogens which may combine readily with the carbon in the charcoal. However, there are many more serious contaminants, such as disease and illness-causing bacteria, which are not effectively removed by charcoal. It has been generally thought to be necessary, in order to remove bacteria, to boil or distill drinking water for domestic use.

Accordingly, it is one object of the present invention to provide an improved water filtration apparatus which is sufficiently economical in cost and operation to be suitable for domestic use.

It is another object of the present invention to provide a water filtration apparatus which is of greatly improved effectiveness, and which will substantially reduce the bacterial count of drinking water.

Another object of the present invention is to provide an improved water filtration apparatus having a plurality of different active filter media which are effective in removing all of the different types of major water contaminants.

Another major problem in prior attempts at producing a satisfactory domestic water filter is that the water filter itself is a serious breeding place for bacteria. Experiments with such filters have shown that the first water, emitted from the filter after a number of hours of non-use, often has a very high bacteria count.

Accordingly, it is another important object of the present invention to provide an improved water filtration apparatus which substantially avoids the problem of bacterial growth within the apparatus during periods of inactivity.

Another problem in the production and use of an effective water filter is that it is often difficult to determine when the filtration medium is depleted or exhausted and no longer capable of effective filtering action.

Accordingly, it is another object of the present invention to provide an improved filtration apparatus in which a definite and positive indication is available to the user, to show when replacement of the filtration medium is required.

It is another object of the invention to provide an improved water filtration apparatus in which the effectiveness of the filter media remains substantially completely unimpaired in terms of the purity and potability of the water which is supplied from the apparatus no matter what the stage of depletion or exhaustion of the filter media may be.

It is another object of the invention to provide a water filtration apparatus in which the filter media is very easily and simply replaced or recharged.

Another object of the invention is to provide an improved water filtration apparatus in which different combinations of filtration media may be supplied for different water contamination conditions, and in which the filter media may be quickly and easily selected to cope with the specific contamination conditions encountered.

It is another object of the present invention to provide an improved filter device for use as a component in a water filtration apparatus.

Another object of the invention is to provide an improved water filtration apparatus in which dissolved minerals and mineral salts may be removed to provide a demineralized product for use as drinking water for persons who must restrict mineral intake, and for other purposes for which water must usually be distilled for removal of mineral content.

Further objects and advantages of the invention will be apparent from the following description and accompanying drawings.

In carrying out the invention there is provided apparatus for improving the purity of water comprising a portable housing defining a container for water to be treated, said container including an outlet opening in the bottom portion thereof, a pump having its inlet connected to said outlet opening, said container also defining an outlet passage connected to the outlet of said pump and communicating with the lower portion of the interior of said container. The apparatus includes a water filter device positioned within said container and including a filter inlet connector connected to said pump outlet passage, said filter device including an integral outlet nozzle extending over the upper edge of said container.

In the accompanying drawings:

FIG. 1 is a side view, partly in section, of a water filtration apparatus in accordance with the present invention;

FIG. 2 is a top view of the apparatus with the cover removed, and showing the filter device only in phantom to indicate the position of the filter device when assembled;

FIG. 3 is a sectional side view of a filter device constructed in accordance with the present invention suitable for use in the apparatus of FIG. 1.

Referring more particularly to FIG. 1, there is shown, partially in section, a water filtration apparatus in accordance with the present invention. It includes a supply container 10 supported upon a base 12. Within the supply container 10 a filter device 14 is mounted. The filter device 14 includes an integral discharge spout or nozzle 16 which extends out over the edge of the container 10. Pump 18 is attached to the bottom of the supply container 10, and preferably froms an integral part of the container, for receiving water directly from the reservoir compartment, defined by an upper vertical wall through an outlet opening 20 in the bottom of the container 10, and for pumping the water through a pump outlet passage including a hose connection 22 and a fitting 24, and into the filter device 14.

The supply container 10 includes a continuous bottom wall 26, and the base 12 has a continuous upper wall 28. These walls are secured together, thus securing the container 10 and the base 12 together, by means of the fitting 24 and the pump attachment. The fitting 24 includes a threaded nut 30, and the pump inlet attachment includes a threaded nut 32, by means of which the walls 26 and 28 are clamped together. A metal reinforcing plate 33 is also preferably clamped together with the walls 26 and 28, as shown. Beneath the flange of the fitting 24 there is an 0 ring 39 which serves to provide a leakproof seal. The nut 32 is provided with a built-in seal, not shown.

The pump 18 is such as a non-positive displacement pump, preferably of the centrifugal type, and capable of providing about 500 cubic centimeters of flow volume per minute at a pumping pressure in the order of 30 to 36 centimeters of mercury. The pump may preferably include an integral electric motor supplied with power through connection indicated at 34. The power may be the conventional 110 volt AC, or 12 volts DC. If a 12 volt DC motor is used, power may be supplied through a small solid state DC power converter which is structurally combined with the power cord plug. A switch such as a toggle switch or a rocker switch 35 is provided in the side of the base 12 to turn the motor on and off as necessary. When portability is required, the pump may be energized by batteries. Also, if desired, a manually operated pump may be employed.

The base 12 also preferably includes a stand portion 36 for supporting and positioning a beaker 38 so that the beaker is properly positioned directly beneath the spout 16. In order to position the beaker, the stand 36 preferably includes an outer upwardly extending rim or ring 40 to maintain the beaker in the correct position.

The outlet from the pump 18 is defined, in part, by the fitting 24 and an integral cylindrical protrusion or nipple 46 extending upwardly from the bottom of the container 10. Nipple 46 may be considered as an integral part of the container bottom 26. This nipple 46 extends into a bottom inlet opening bore 42 of the filter device 14. The filter device 14 requires a positive liquid pressure in the order of twenty-five centimeters of mercury. This requires that the connection from the nipple 46 to the filter device inlet bore 42 should be reasonably tight. This is accomplished by means of an 0 ring 44 mounted upon nipple 46 to provide a seal. However, it is one of the convenient features of the invention that if there is leakage of water from the discharge of the pump 18 at the connection provided by nipple 46 to the filter device 14, such leakage simply causes the water to bypass the connection and to flow back into the container. Thus, no serious harm results from such leakage. One of the main functions of the seal provided by 0 ring 44 is to prevent the pump pressure from pushing the filter device 14 up and off of the connection to nipple 46.

The container 10 is provided with a removable cylindrically shaped cover 48 which covers and protects the opening in the top of the container 10, and which surrounds and covers the spout 16 of the filter device 14. The filter device 14 is preferably formed in the shape of a frustum of a cone and is positioned within the container by means of an integral frame which is formed in the upper portion of the container 10. This is shown more fully in the top view of the apparatus in FIG. 2 and described below in connection with that figure.

To operate the device, the cover 48 of the container is removed, and water to be filtered is poured into the container, to the level indicated at 50. Electrical power is then applied to the motor of the pump 18, as by turning on the switch 35, and the water is pumped from the bottom of the container through the pump inlet 20 and out through the hose connection 22, the fitting 24 and thus into the filter device 14. The filtered water emerges from the spout 16 and flows into the beaker 38 in the manner indicated at 52.

FIG. 2 is a top view of the apparatus of FIG. 1, with the cover 48 removed, and illustrates, in dashed lines, the outline of the filter device 14. As illustrated in this view, the upper portion of the container 10 has a contoured cut out opening which includes a circular portion 54 of reduced diameter, the circular portion 54 extending for more than 180°, actually in the order of 230° in the preferred embodiment. This circular portion is of the proper diameter to provide a loose fit with the circular upper periphery of the filter device 14, immediately under the surface of the spout 16, in order to and hold the upper portion of the filter device in the desired position. This circular portion of the upper container opening may be characterized as an integral frame defining an opening consisting of the circular portion 54 through which the filter device 14 may be inserted and removed, and providing a positioning support for the filter device. The upper portion of the filter device may include wing members indicated at 56 and 58 having back edges which are intended to align with corresponding edges 60 and 62 of the upper opening of the container 10 when the filter device 14 is in the proper rotational position with respect to the container 10. This assures that the spout 16 is properly positioned over the edge of the beaker 38.

As further illustrated in FIG. 2, the container 10 is provided with an arcuate indentation, 64, the radius of which permits the beaker 38 to nest in the indentation 64. This further serves to properly position the beaker 38 with respect to the spout 16. However, even though the container 10 is in the shape of a cylinder interrupted by the cylindrical indentation at 64, the cover 48 illustrated in FIG. 1 is in the form of a complete circular cylinder so that it surrounds and covers the spout 16 as well as the top of container 10.

FIG. 3 is a cross sectional view of the filter filter 14. The device 14 is shown as comprising a lower housing member 64 and a housing cover member 66, which are sealed together to comprise the complete housing including the integral spout 16. A distributor filter disc 68 is mounted within the housing, and is supported and secured upon a lower shelf formed integrally within the housing. An upper or final filter disc 70 is similarly positioned and secured at an integrally formed positioning shelf in the upper portion of the lower housing member 64. A particular filter media is contained between the filter discs 68 and 70. While the housing 14 may be satisfactorily made from many different materials for a high impact polystyrene has been found to be ideal in one preferred embodiment.

The filter discs 68 and 70 are preferably made from of polyethylene. The distributor filter disc 68 may typically be in the order of three milimeters in thickness with pore opening of a nominal 35 to 125 microns in diameter. This distributor filter disc 68 serves the purposes of filtering out gross solid impurities, serves to regulate the even flow of water into the filter, and acts as a distribution device to evenly distribute the water entering the filter through the particulate filtering material 72. The upper filter disc 70 has much finer pores which may for example, be nominally 10 microns in diameter. It is effective to clarify the water and to keep the particulate filtering media 72 from leaking out of the filter device 14. The upper filter disc 70 may also be in the order of 2 millimeters in thickness. Both of the filter discs 68 and 70 may have about a 40 percent proportion of void.

The particulate filter media 72 may be formed from various compositions which are specifically formulated to cope with local water purification problems. However, a very satisfactory filtering media where the objective is to provide potable water from contaminated sources is activated charcoal. The activated charcoal is effective to remove a variety of organic contaminants, and undesirable odor producing constituents from the water. It also is effective to remove chlorine and a variety of other undesirable chemicals from the water.

If serious purification problems are encountered, chlorine may be added to the water in container 10 in order to kill the bacteria in the water. The chlorine, with its unpleasant taste and smell, is then removed by the charcoal in the filter media 72 also if desired, about ten to sixteen percent of the charcoal is coated with metallic silver, or a silver salt to kill bacteria which may be contained in the water. The silver is also particularly important for the purpose of effectively preventing the growth of bacteria within the filter device when the apparatus is permitted to stand for a period of time without being used. Where metallic silver is used, the material is ionic silver. Various silver salts may be used, but silver nitrate is very effective, and is preferred.

When reduction of the mineral content of the water is the major considration, rather than merely potability of the water, the particulate filter medium is preferably a mixture of resin ion exchange media, different constituent portions of which are effective to combine with, and eliminate the different minerals in the water. For example a manganese zeolite may be blended with the filter medium 72 to effectively remove traces of iron, copper and manganese from the water. Another type of ion exchange media may be a strong acid, strong base mixed bed ion exchange medium, treated with a food geade dye to indicate the depletion of the ion bed by color change. With this filter media the housing 64–66 of device 14 is preferably composed of clear polystyrene so that a dye indicator is easily observable to indicate when the ion exchange media has been depleted in its metal removal action.

Also a layer of silver bearing charcoal may be placed above the distributor filter disc 68 to combat the tendency of the ionexchange media to permit bacteria growth within the media.

It is one of the important features of the filter device 14 that the thickness and porosity of the distributor filter disc 68 is such that, with typical water contamination conditions, the distributor filter disc 68 becomes depleted by becoming clogged with intercepted contaminant particles at about the same time that the particulate filter media 72 and the upper filter disc 70 also become depleted. The clogging of the distributor filter disc 68 eventually progresses to the point where no more water can be delivered through the filter device. The pump 18, being a non-positive displacement centrifugal pump, simply is not able to force water through the filter device. Thus, the user becomes aware that the filter device is depleted by the rate of water delivery being progressively reduced and finally essentially stopped. This is a convenient safety feature because the user is not deluded into thinking that his water has been adequately filtered and purified when the properties of the particulate filter media 72 have actually been depleted.

While this invention has ben shown and described in connection with particular preferred embodiments, various alterations and modification will occur to those skilled in the art. Accordingly, the following claims are intended to define the valid scope of this invention over the prior art, and to cover all changes and modification falling within the true spirit and valid scope of this invention.

I claim:

1. Water purification apparatus comprising
a portable container having a water reservoir compartment for storing untreated water and a pumping compartment in juxtaposition to said reservoir compartment, said water reservoir compartment having a bottom wall, an inlet for adding untreated water to said reservoir compartment and a water outlet passage in said bottom wall,
water pumping means having an inlet and an outlet, said pumping means being mounted within the pumping compartment of the portable container and having said inlet thereof connected to the water outlet passage of the water reservoir compartment for receiving water directly from said reservoir compartment, and
a filter means removably mounted within said water compartment of said container, said filter means having an inlet connected to the outlet of said water pump means and an outlet nozzle integrally constructed within the filter means extending over the upper edge of said container, whereby untreated water placed in the reservoir is positively pumped from the reservoir through the filter means for purification and pumped out the integral outlet nozzle of the filter means.

2. Water purification apparatus as in claim 1 wherein the filter means comprises a distributor filter in juxtaposition to the inlet to the filter means, the distributor filter means having pore openings in the range of approximately thirty five to approximately one hundred and twenty five microns in diameter, said pore openings being sufficient to prevent coarse particles in the water from flowing through the filter thereby forming a deposit of coarse particles upon the distributor filter.

3. Water purification apparatus as in claim 2 wherein the pumping means stops pumping water through the filter means upon an excessive accumulation of coarse particle deposits on the distributor filter means.

4. Water purification apparatus as in claim 3 wherein the pumping means comprises a non-positive displacement pump.

5. Water purification apparatus as in claim 4 wherein said pumping means is a centrifugal pump.

6. Water purification apparatus as in claim 1 wherein the outlet of the water pumping means is a pump outlet passage, and the inlet to the filter means has a sealing means for sealing the connection between the filter means and the pump outlet passage.

7. Water purification apparatus as in claim 6 wherein the portable container has an integral frame mounted within the container for providing support for the filter means and permitting the filter means to be easily connected to and removed from the pump outlet passage.

8. Water purification apparatus as in claim 1 further comprising means for mounting a water beaker on said container below the outlet nozzle of the filter means as a receptable for filtered water.

9. Water purification apparatus as in claim 8 wherein the means for mounting the beaker below the outlet nozzle comprises an integrally molded ring shaped member extending outward from the exterior portion of the container, said means including a stand for supporting the beaker in alignment with the outlet nozzle of the filter means.

10. In a water purification apparatus having a self-contained water reservoir for untreated water, means for pumping said untreated water from said reservoir, and filter means for receiving the pumped water, said filter means being removably mounted within the apparatus and connected to the pumping means, said filtering means comprising
  a unitary housing having an inlet for receiving unfiltered water under pressure from the pumping means,
  a distributor filter means mounted within the housing in juxtaposition to the inlet and having pore openings of a size for removing coarse solid particulate matter from water pumped through the filter means,
  a particulate filter means mounted above the distributor filter means for removing organic contaminants and odor producing constituents in the water passing through the filter means,
  an upper filter means mounted above the particulate filter means and having finer pores than said distributor filter means for clarifying the water passing through said upper filter means, and
  an outlet nozzle formed in the housing adjacent to the upper filter means for passing filtered water out of the filter means.

11. A filter means as in claim 10 wherein the passages in the distributor filter means have pore openings in the range of approximately thirty five to approximately one hundred and twenty five microns in diameter to prevent coarse particles in the water from flowing through the filter, thereby forming a deposit of coarse particles upon the distributor filter device.

12. A filter means as in claim 10 wherein the particulate filter means comprises activated charcoal.

13. A filter means as in claim 12 wherein the activated charcoal is coated with a bacteria preventing means to prevent the growth of bacteria within the particulate filter means.

14. A filter means as in claim 13 wherein the activated charcoal is coated with ionic silver to prevent the growth of bacteria within the particulate filter means.

15. A filter means as in claim 13 wherein the coating on the activated charcoal comprises a silver salt to prevent the growth of bacteria within the particulate filter means.

16. A filter means as in claim 15 wherein silver salt is silver nitrate.

17. A filter means as in claim 10 wherein the upper filter means has passages with pore openings in the range of approximately 10 microns in diameter.

18. A filter means as in claim 10 wherein the particulate filter means comprises at least one ion exchange resin for removing minerals from the water.

19. A filter means as in claim 18, further comprising a layer of silver coated charcoal mounted in juxtaposition to the distributor filter to prevent the growth of bacteria within the ion exchange means.

20. A filter means as in claim 10 wherein the particulate filter means comprises a plurality of ion exchange resins, each of said resins being adapted to remove a particular mineral from the water.

21. A filter means as in claim 10 wherein said particulate filter means comprises the combination of at least one ion exchange resin and activated charcoal having a silver compound coating upon the activated charcoal.

22. A filter means as in claim 21 wherein the ion exchange resin is a manganese zeolite blended with the particulate filter means to remove substantially all iron, copper and manganese from the water.

23. A portable water purification apparatus comprising
  a base having a pump mounted therein;
  a container mounted on said base in an upright seal-tight manner, said container having a bottom wall, an upper wall defining a water reservoir compartment therein, and an outlet opening in said bottom wall communicating with said pump for delivering all of the water in said reservoir compartment to said pump;
  a filter means removably mounted on said bottom wall and in said container within said reservoir compartment, said filter means having an inlet at a lower end connected to an outlet of said pump to receive untreated water therefrom, an outlet nozzle at an upper end extending over the upper edge of said container for discharging treated water, and a particulate filter means for removing contaminates from the water passing from said inlet to said outlet nozzle.

24. A portable water purification apparatus as set forth in claim 23 wherein said base includes a stand portion for positioning a beaker thereon below said outlet nozzle and said container has an arcuate indentation to permit nesting of a beaker therein while on said stand portion.

\* \* \* \* \*

UNITED STATES PATENT AND TRADEMARK OFFICE
CERTIFICATE OF CORRECTION

PATENT NO. : 3,950,253
DATED : April 13, 1976
INVENTOR(S) : Emanuel Stern

It is certified that error appears in the above-identified patent and that said Letters Patent are hereby corrected as shown below:

In the Abstract:

Line 2,             delete "to"

In the Spec.:

Column 1, line 16 - delete "--, after disagreeable"

Column 1, line 25 - delete "the" (first occurrence)

Column 3, line 13 - change "froms" to --forms--

Column 3, lines 33-34 - change "The pump 18 is such as a non-positive displacement pump, preferably of the centrifugal type, ..." to read:

--The pump 18 is preferably of the non-positive displacement type, such as a centrifugal pump, ... --

Column 5, line 9 - delete "for"; add --,-- after "materials"

Column 5, line 12 - delete "of" before "polyethylene"

Column 5, line 14 - change "opening" to --openings--

UNITED STATES PATENT AND TRADEMARK OFFICE
CERTIFICATE OF CORRECTION

PATENT NO. : 3,950,253
DATED : April 13, 1976
INVENTOR(S) : Emanuel Stern

It is certified that error appears in the above-identified patent and that said Letters Patent are hereby corrected as shown below:

Column 5, line 54 - change "merely" to --mere--

Column 6, line 3 - insert "-" between "ion" and "exchange"

Column 6, line 28 - change "modification" to --modifications--

Column 6, line 31 - change "modification" to --modifications--

Signed and Sealed this

Twenty-fourth Day of August 1976

[SEAL]

Attest:

RUTH C. MASON
Attesting Officer

C. MARSHALL DANN
Commissioner of Patents and Trademarks